(12) United States Patent
Perez Monsrreal (10) Patent No.: US 9,890,067 B2
(45) Date of Patent: Feb. 13, 2018

(54) MODULAR WASTEWATER TREATMENT PLANT

(76) Inventor: Jose Rogelio Perez Monsrreal, Merida (MX)

( * ) Notice: Subject to any disclaimer, the term of this patent is extended or adjusted under 35 U.S.C. 154(b) by 887 days.

(21) Appl. No.: 14/117,616

(22) PCT Filed: May 11, 2012

(86) PCT No.: PCT/MX2012/000053
§ 371 (c)(1),
(2), (4) Date: Oct. 2, 2014

(87) PCT Pub. No.: WO2012/158012
PCT Pub. Date: Nov. 22, 2012

(65) Prior Publication Data
US 2015/0014245 A1    Jan. 15, 2015

(30) Foreign Application Priority Data
May 13, 2011 (MX) .................... MX/a/2011/005080

(51) Int. Cl.
*C02F 11/04* (2006.01)
*C02F 3/28* (2006.01)
(Continued)

(52) U.S. Cl.
CPC .......... *C02F 11/04* (2013.01); *B01D 21/0042* (2013.01); *B01D 21/2416* (2013.01);
(Continued)

(58) Field of Classification Search
CPC ...... C02F 11/04; C02F 3/2806; C02F 3/2826; C02F 2203/006; C02F 3/06; C02F 3/30;
(Continued)

(56) References Cited

U.S. PATENT DOCUMENTS

| 4,614,584 A | 9/1986 | Di Duca |
| 5,531,894 A | 7/1996 | Ball et al. |

(Continued)

FOREIGN PATENT DOCUMENTS

| CN | 2356028 | 12/1999 |
| EP | 0225965 | 6/1987 |

(Continued)

OTHER PUBLICATIONS

English Translation of International Search Report for PCT/MX2012/000053 dated Dec. 5, 2012.

(Continued)

*Primary Examiner* — Fred Prince
(74) *Attorney, Agent, or Firm* — Polsinelli PC (57) ABSTRACT

The invention relates to a wastewater treatment plant, specifically a modular plant for the treatment of organic wastewater, in which the number of devices depends on the amount of water to be treated and on the quality of the starting water and that required for the water at the end of the process. The treatment plant includes multiple devices, each representing a treatment step, and the devices can be connected in series, in parallel or in series and parallel. In addition, the devices used in the process are designed to require a minimum amount of maintenance, owing to the inclusion of a self-cleaning system. Since the system requires minimal power and maintenance, it is considered optimal for use in rural communities, livestock farms or buildings.

9 Claims, 11 Drawing Sheets

(51) Int. Cl.
*C02F 3/30* (2006.01)
*C02F 3/32* (2006.01)
*B01D 21/00* (2006.01)
*B01D 21/24* (2006.01)
*C02F 3/06* (2006.01)

(52) U.S. Cl.
CPC ..... *B01D 21/2427* (2013.01); *B01D 21/2483* (2013.01); *C02F 3/06* (2013.01); *C02F 3/2826* (2013.01); *C02F 3/2806* (2013.01); *C02F 3/30* (2013.01); *C02F 3/32* (2013.01); *C02F 2203/00* (2013.01); *C02F 2203/006* (2013.01); *Y02W 10/15* (2015.05)

(58) Field of Classification Search
CPC .... C02F 3/32; C02F 2203/00; B01D 21/0042; B01D 21/2416; B01D 21/2427; B01D 21/2483; Y02W 10/15
USPC ........ 210/605, 615, 616, 150, 151, 252, 259
See application file for complete search history.

(56) References Cited

U.S. PATENT DOCUMENTS

| | | | |
|---|---|---|---|
| 5,705,057 | A | 1/1998 | Hoffa |
| 6,319,396 | B1 | 11/2001 | Heagey |
| 6,682,654 | B1 | 1/2004 | Telchuk |
| 7,297,274 | B2 | 11/2007 | Wilkie |
| 2011/0017664 | A1* | 1/2011 | Conner ............... B01F 3/04517 210/631 |

FOREIGN PATENT DOCUMENTS

| | | |
|---|---|---|
| EP | 0514543 A1 | 11/1992 |
| EP | 0937686 | 8/1999 |
| GB | 521036 A | 5/1940 |
| JP | 2001-079576 | 3/2001 |
| WO | 2006091064 A1 | 8/2006 |
| WO | 2010002358 A1 | 1/2010 |
| WO | 2010093232 A1 | 8/2010 |
| WO | 2012158012 A2 | 11/2012 |

OTHER PUBLICATIONS

English Translation of Written Opinion of the International Searching Authority for PCT/MX2012/000053 dated Dec. 5, 2012.
Spanish version of International Search Report for PCT/MX2012/000053 dated Dec. 5, 2012.
Spanish version of Written Opinion of the International Searching Authority for PCT/MX2012/000053 dated Dec. 5, 2012.
English translation of Abstract for European patent document EP 0937686, listed as item#5 above.
English translation of Abstract for Japanese patent document JP 2001-079576, listed as item #6 above.
Office Action in the corresponding Canadian Patent Application No. 2835308, dated Mar. 17, 2015, 4 pages.
Extended European Search Report in the corresponding European Patent Application No. 12785004.8, dated Oct. 10, 2014, 7 pages.
English Abstract of CN 2356028, published Dec. 29, 1999, 1 page.

* cited by examiner

MODULAR WASTEWATER TREATMENT PLANT

CROSS-REFERENCE TO RELATED APPLICATIONS

This application is a national stage entry of PCT/MX2012/000053 filed May 11, 2012, which claims priority to MX/a/2011/005080, which was filed on May 13, 2011, said applications are expressly incorporated herein in their entirety.

Technical Field of the Invention

The present invention relates to a modular system for the treatment of waste water mainly in rural communities, suburban areas and buildings.

BACKGROUND

Most waste water treatment plants use electromechanical equipment and are completely aerobic, therefore requiring special skills for their operation, frequent maintenance, and high energy consumption; in addition, they generate a high volume of sludge. Even though their acquisition is economical and they require little space, this type of waste water treatment plant is more appropriate for urbanized places and is not adequate for rural or semi-urban communities.

Due to the aforementioned challenges, a modular plant was designed which features low operation mixed processes which, even in a worst case scenario, guarantees an acceptable treatment, as it has the advantage of being largely anaerobic with a great capacity of retention. Consequently, this type of plant is able to absorb the peaks of the influent and keep the possibility of obtaining bio-gas while producing low quantities of sludge for later use.

One of the biggest problems to solve is the treatment of waste water coming from small communities and those with small livestock farms, which in both cases, discharge their waste water into rivers or other water sources without treatment of any kind.

The Mexican patent MX No 213398, issued Oct. 22, 2002, was our first proposal to address the problem.

The patent application YU/a/2005/000003, dated Feb. 22, 2005, aims at increasing the efficiency of the previously developed septic tanks, where a smaller diameter at the output reduces the speed of the process thereby decreasing the dragging of solids and supernatants while increasing buoyancy and decantation which results in higher efficiency of the unit.

In the patent application MX/a/2009/001621, the size of the filter was increased and it was placed at a greater depth which resulted in collecting fewer solids. The output in the decanter in the upper part was directed downwards which improved the functioning of the decanter-skimmer. The filter was made deeper to increase the anaerobic function and a collector was added to the discharge in order to let in air and eliminate the anaerobic pollution, thus substantially improving the previous device.

The units designed in this way cover the needs of a dwelling but not the needs of a small community or suburban area. Therefore, some modifications to the filter were made seeking the integration of several units while retaining the characteristic of the tank of being self-cleaning.

DESCRIPTION OF THE FIGURES

a) A tank with a screen
b) A decanter bio-reactor
c) An anaerobic filter
d) An artificial wetland When the process starts, water with a certain concentration is received which then passes through a tank with a screen, a decanter filter bio-reactor, a first anaerobic filter, and a wetland (64), in order to obtain water with the proper conditions to measure the final outcome.

The sampling done in September 2010, six months after the test was started, shows quality infiltrates of the water as it passes through each of the units of the process and accounts for contaminant removal at each stage of the treatment.

DETAILED DESCRIPTION OF THE INVENTION

Figure 1:
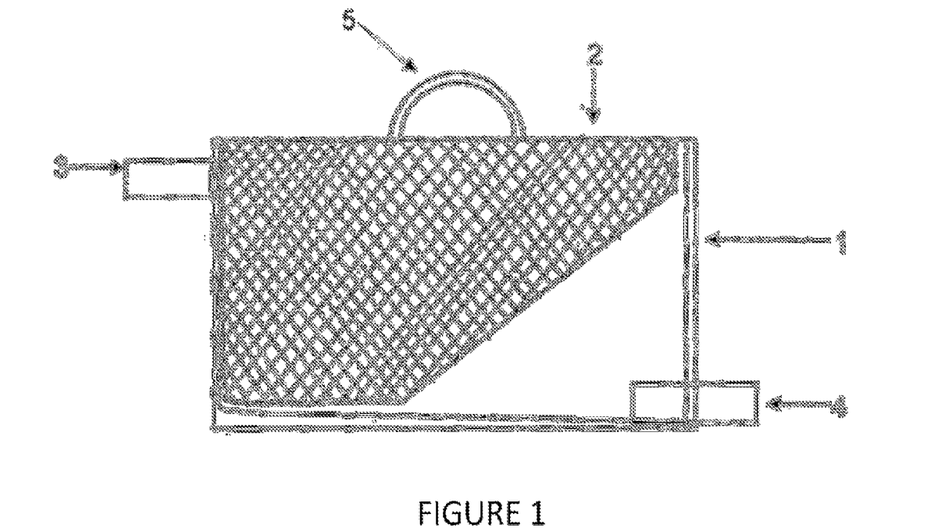
FIG. 1 is a tank for screening with the screen placed in the interior.
Figure 2:
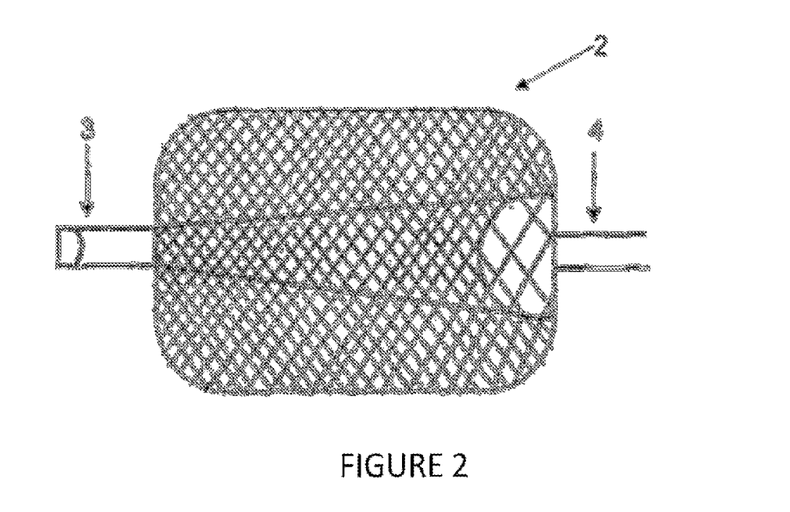
FIG. 2 is an upper view of the screen which is canister-shaped.

According to the figures, the present invention comprises the following elements:

A tank (1) and a canister type screen (2), which is placed in the interior of the tank. The tank has an influent feeding element (3) on the upper part and a discharge element (4) on the lower part of the opposite face. The feeding element is placed in such a way that there is a difference in level with the bottom of the tank. The side opposite to the feeding element is lower. A canister shaped removable screen (2) is placed inside the tank to eliminate the solid waste which could affect the operation of the plant. This removable screen (2) is canister-shaped and is supported by the upper rim of the tank. It has handles and hinges (5) to facilitate removing it and turning it over easily along with any collected debris. The removable screen, seen from the side, has a trapezoidal shape whose longer side conforms to the surface of the tank. Its main face is therefore adjacent to the face where the influent feeding element is located; the opposite face has an ascending side, which prevents the solids retained in the screen from obstructing the flow of the liquid to the discharge element (4) and therefore to other mechanisms involved in the process. The canister has been designed so that it does not touch the bottom of the tank, thus allowing a better flow.

Figure 3:
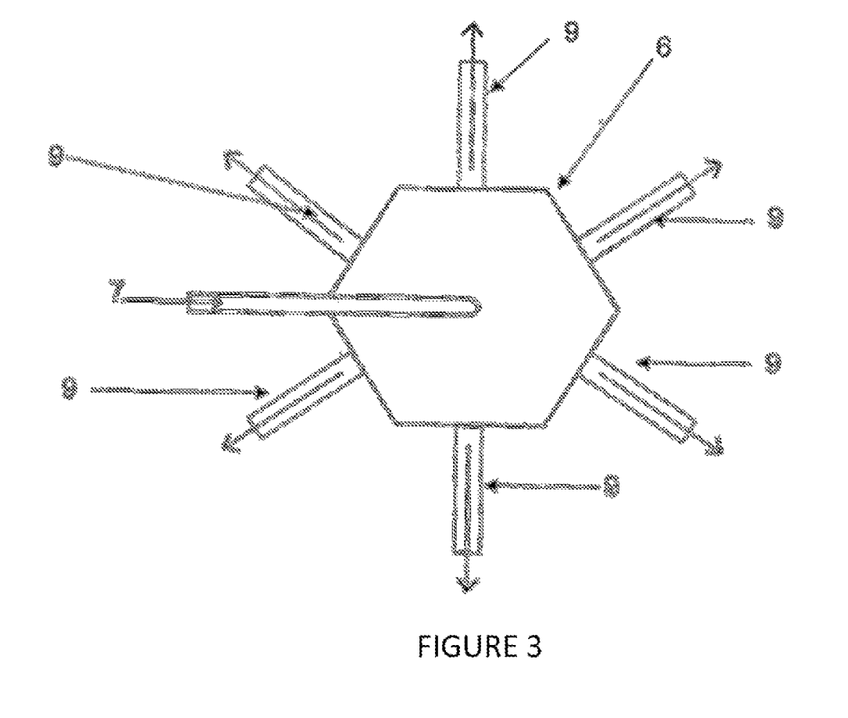
FIG. 3 is a lower view of the influent distributor.
Figure 4:
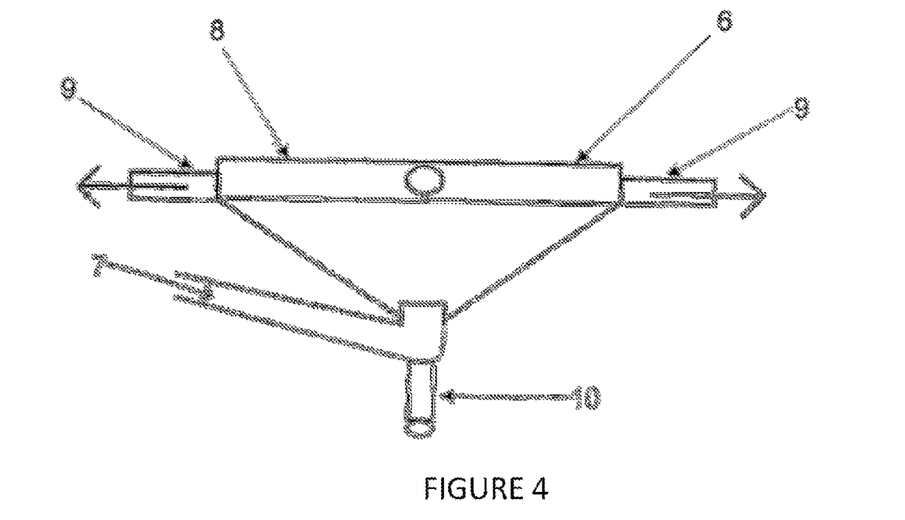
FIG. 4 is a lateral view of the influent distributor.

The water treatment plant has a flow distributor (6) (FIG. 3) which works by gravity. The gravity flow distributor (6) is a container whose objective is to evenly distribute the flow to other elements to prevent its decantation and skimming. Its construction consists of a funnel shaped element, with a conical or concave bottom. The water to be treated is fed through the bottom by means of a feeding pipeline (7), the water goes up to the upper part (8) which is completely horizontal, and has exit openings (9) along its periphery at the same level as the distributor which is also completely horizontal as well as the distribution tubes which connect to other elements, thus keeping an evenly distributed flow for each tube. The upper lateral part of the distributor can have different shapes depending on the application; it can be circular, octagonal or any other regular geometrical shape, according to the number of elements to which the flow will be distributed, as long as the characteristic conical or concave bottom of the tank and the completely horizontal exits placed at the same level remain unchanged. This treatment plant also has a purge drain (10) for the settled sludge. The distributor (6) feeds one or more vertical type decanter-bioreactors (11) (FIG. 3).

The biological treatment starts by using anaerobic equipment to get a greater absorption of peaks, while requiring less energy and producing lower amounts of sludge.

Figure 5:
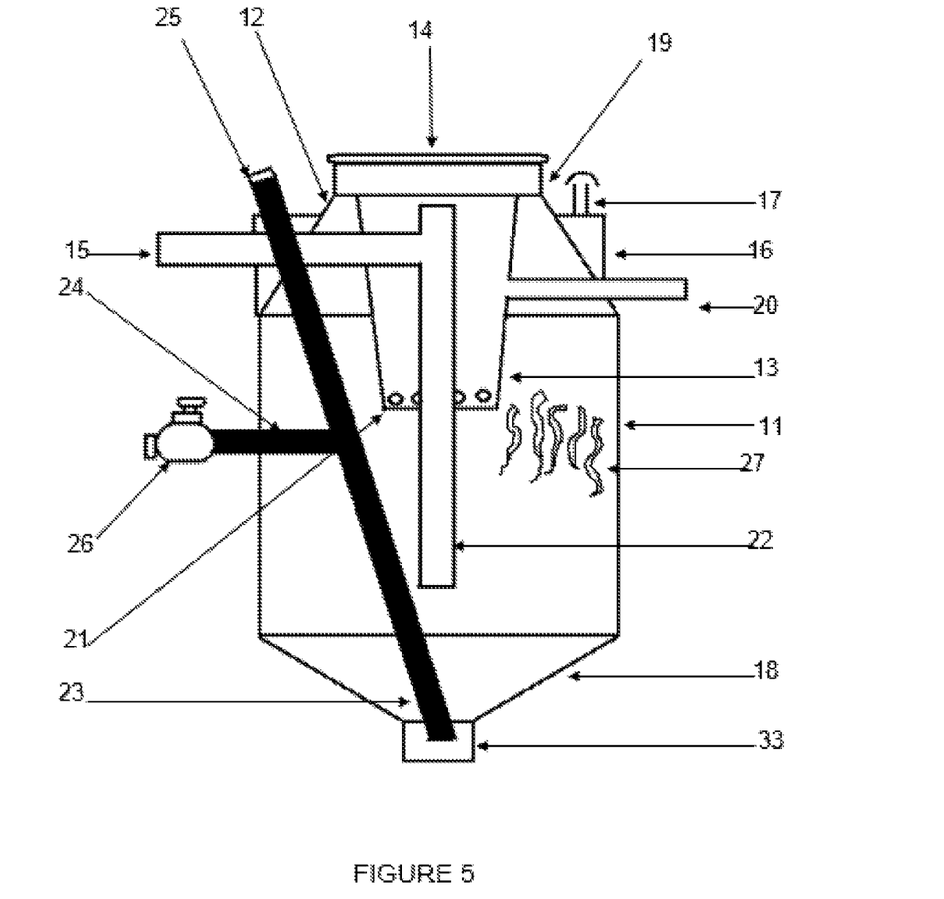
FIG. 5 shows a decanter-bio-reactor.

The decanter-bioreactor (11) is a container whose body is divided into several sections. The upper part (12) is a frustum or vault, the mouth of the vault or the truncated part of the container (19) is the best area to support another container or filter (13) and the container's corresponding lid (14). The decanter also has prism or arc-shaped projections (16) on its upper part, which are adjacent to the vaulted or conical section, and which help give more mechanical resistance to the container. The vertical face of one of these projections is used to hold the horizontal feeding tube (15), while the horizontal face of one of the other projections is used to hold a vent (17). The middle part of the container is a cylinder or a cylindrical trunk, whose lower part is divided into two sections: one section has the form of an inverted frustum or vault (18), and the other has a cylindrical form with a flat bottom (33), at the end of the narrowing of the cone (18). The decanter-bioreactor has a feeding tube (15) and an inverted filter (13), a vent (17), a tube to extract sludge (23) and an output duct (20).

The water to be treated can be fed through the upper part, if the feeding is done laterally, through the feeding duct (15) which is a tube that consists of two sections: the first horizontal section reaches up to the center of the decanter bioreactor passing through the filter (13) and ending in a "T", where one of the arms reaches almost to the lid (14) of the decanter, while the other end of the "T" (22) stretches vertically downward, going through the bottom of the container or filter (13), having a shorter length than the length of the cylindrical section of the container.

Inside the decanter there is a container or filter (13) supported by the mouth (19) of the decanter, which is an element shaped as a frustum closed in its lower part where only the vertical section (22) of the feeding tube (15) crosses to deposit the flow near the inferior conical section of the decanter. The container (13) has a series of openings (21) in the lower part of the surface to allow the fluid to enter the container or filter (13) in a lateral way. The discharge tube (20), whose diameter is narrower than the diameter of the feeding duct and thus slower (15) is located on the periphery of the upper part of the filter, in a horizontal position, opposite to the feeding duct and at a height lower than that of the level of the feeding duct (15).

The decanter bioreactor (11) also has an inclined duct (23) or a maintenance duct which goes from the upper part of the decanter passing through one of the projections (16) to the bottom of the lower part of the decanter. The maintenance duct (23) has a lid (25) on its upper part and a horizontal shunt (24) which is located at a height lower than the feeding duct (15) and the discharge duct (20) where the shunt goes through the wall of the decanter (11), and in its free end has a valve (26) to allow for the cleaning of the system; it also has a vent (17) in the upper part of one of the projections (16) which consists of a duct that permits the output of gases. An accelerated decanter (27) can be added to this system to accelerate the process.

The discharge tube (20) feeds an inverted anaerobic filter (28) (FIG. 6) whose exterior geometry is equal to the geometry of the decanter (11), therefore having the same upper section (29), cylindrical section (30), triangular projections (31), lower conical section (32), and lower cylindrical section (33b), but not necessarily the same capacity, volume or contents. The anaerobic filter has a feeding duct (34) which reaches up to the center of the filter, permitting the feeding to be done laterally or from the upper part, but the tube rests at the center of the lower part and ends in a "T" (35). One arm of the "T" reaches almost to the lid (36) of the filter (28), while the other arm of the "T" stretches to the lower part of the filter (28) passing through the upper tank (37) and reaching the interior of the lower tank (38). The anaerobic filter (28) has a tank (37) in the shape of an inverted frustum and is supported by the mouth of the filter; this tank is closed at its base and has a series of openings (39) in the lower part of its periphery. Additionally the tank (37) has a chute (40) which is connected to the output duct (41). The filter also has a duct to extract sludge (42) which consists of an inclined tube that goes from the exterior of the filter, passing through one of the projections (31) and the inferior tank (38) and reaching the lower cylindrical section (33b) where the tube has a horizontal shunt (24b) placed below the feeding duct (34) and below the discharge duct (41). This shunt goes through the wall of the filter (28) and has a valve (26b) attached to its end. Additionally, the anaerobic filter has a vent (43) in one of the projections (31).

Figure 7:
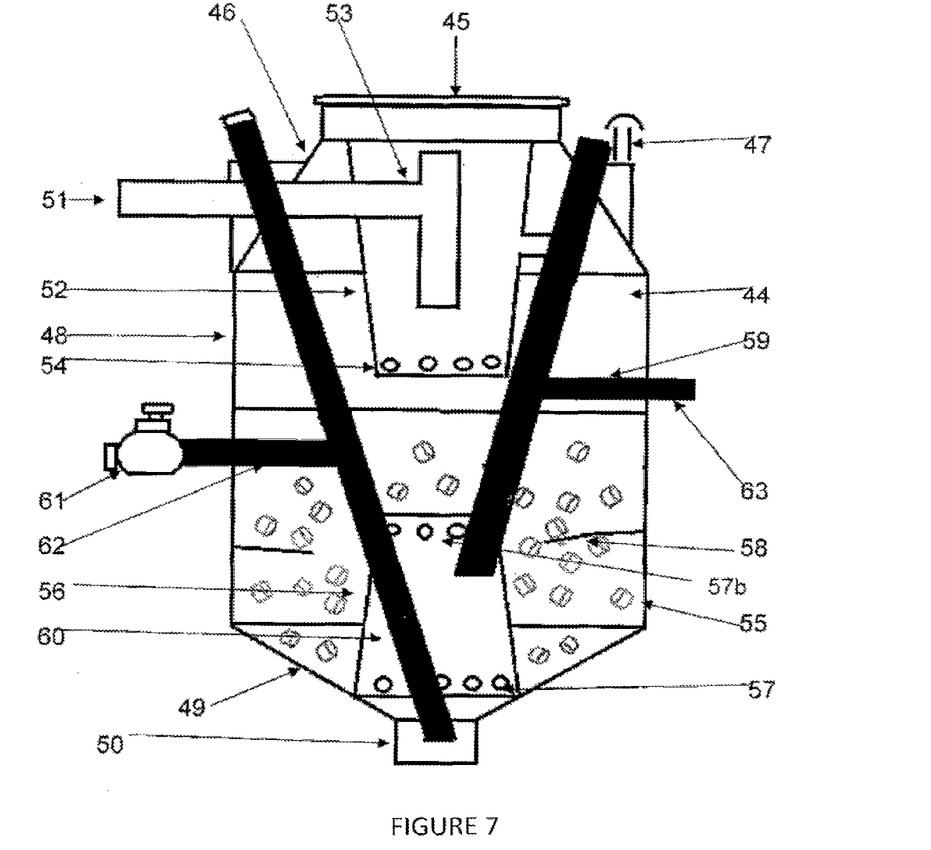
FIG. 7 shows a modality of the aerobic filter.

In addition, the water treatment plant can include a second filter; however, in contrast to the filter described previously, this filter is aerobic (44). The aerobic filter is a tank with geometry similar to that mentioned above and comprises the same components which are a lid (45), a conical or concave upper section (46), projections or vaults (47), a cylindrical body (48) and a lower conical section (50). The aerobic filter (44) has a feeding duct (51) which consists of a horizontal tube that goes through the wall of the tank (44) and the wall of the inner upper container (52) to the central part where it ends in a "T" shunt (53). One arm of the "T" (53) is projected upwards while the other arm pours the liquid inside the container (52) which functions as a chute distributing the liquid by means of a series of openings (54) which are located in the lower periphery of the wall of the container, and to the contact material (55) which is located inside the aerobic filter (44). At the bottom, inside the aerobic filter, there is another container with the shape of an inverted frustum (56) which has a series of holes (57, 57b) in the upper and lower parts of the periphery to allow the flow of the liquid and sludge to the interior but not to the contact material (55). The filter can have a bubble aerator fed by means of a pipeline and an air pump (not shown). The treated water is extracted using either a pump or a difference of level with respect to the lower recipient (56). The duct (59) also has a pair of couplings which begin in the last section. The duct (59) is fitted in an inclined position and has a horizontal shunt (63); the duct (59) also has an output placed in the upper half of the cylindrical element of the aerobic filter in a position lower than the upper container (52). The aerobic filter (44) has a duct for the extraction of sludge (60) which consists of a tube placed in inclined position that stretches from one of the projections (47) to the bottom section (49); the tube has a valve (61); the horizontal shunt (62) is located below the height of the output of treated liquid and below the feeding duct. At the end of the treatment system, the treated water is sent for post treatment to an artificial wetland (64), an absorption ditch, an absorption field, or a receptor body.

Operation of the Water Treatment System

The discharges of waste water are sent to a tank (1) through a duct (3) which has a screen (2). As described before, the screen has the shape of a canister, where one part of the screen touches the surface of the reservoir while the other part forms an inclined plane aimed at the discharge tube (4), letting the liquid pass and keeping the liquid discharge element free from obstructions. The liquid discharge element is located at the bottom of the tank (1) opposite the feeding duct (3). Once the solids have been removed from the water, the water goes to the flow distributor (6) as described above, where it is evenly distributed through pipes all having the same transversal section or diameter, to different decanter bioreactor units. Next, the liquid flows to a vertical bioreactor (11) to process the mixture (water plus pollutants). The feeding duct (15) goes through the wall of the system and the wall of a container (13) that is supported on the mouth of the decanter bioreactor, until it reaches the center of the unit, where the feeding duct (15) has a "T". One of the arms of this "T" is directed upwards and stretches up to the lid (14) and the other arm stretches down to the lower part of the decanter bioreactor (11) going through the bottom of the container (13) without reaching the lower conical section where it discharges. The geometry of the decanter bioreactor (11) allows the fluid to enter at the bottom of the system, directing the flow to the conical section of the bottom (18). The lower conical section facilitates the collection of sludge as it works by gravity, thus keeping the concentrates and the sludge in the lower cylindrical section (33) which works as a collector. As the decanter bioreactor gets filled, the fluid rises to reach the container (13) by entering a series of openings (21) placed perimetrically in the lower zone of the wall of the container (13) until it reaches the discharge duct (20) for digested sludge or excess sludge (22) which from this area will be sent to the next stage. However, if maintenance is needed, the sludge extraction valve (26), which is located at the end of the shunt (24) of the duct for sludge discharge (23) can be opened thus taking advantage of the pressure of the hydrostatic column in the decanter bioreactor (11) to move the accumulated sludge. As an alternative, in case there is not enough pressure, the cleaning can be done through mechanical means in the upper part of the duct (23), which is used to clean the duct if it gets obstructed, first by removing the lid (25). The decanter bioreactor has a vent (17) to release the gases produced during the decomposition process. An accelerated decanter (27) can be attached to this system to improve its operation.

Figure 6:
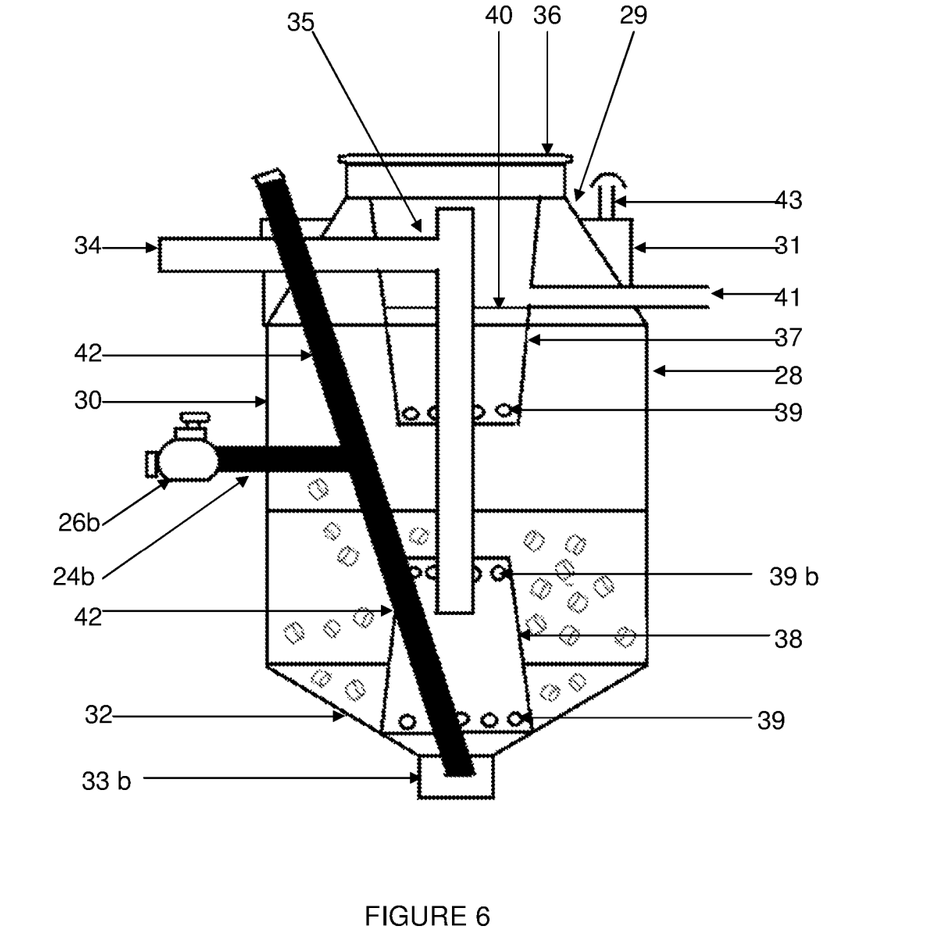
FIG. 6 shows a cut view of the anaerobic filter.

The discharge tube of the decanter bioreactor is connected to the feeding duct (34) of the anaerobic filter (28) which was described above. The water enters through the upper part of the anaerobic filter (28) by means of the duct (34) which carries the water to the center where there is a "T" (35); one of the arms of the "T" stretches upwards until it reaches the lid (36) of the anaerobic filter, while the other arm of the "T" (35) reaches the bottom of the anaerobic filter (28), going through the upper tank (37), and discharging the fluid near the lower conical section (32) inside the inner lower tank (38). The fluid leaves the inner tank (38) through the perimetrical openings (39*b*) located in the upper rim. The liquid goes through the upper openings (39*b*) and rises to the upper tank (37) due to the difference in density and enters it through a series of openings (39) located perimetrically in the lower rim of the upper tank (37) moving upwards until it reaches a chute (40) which consists of a duct open in its upper end, in such a way that the water pours in before leaving the anaerobic filter (28) through the output duct (41). The chute has great relevance to the treatment process as it permits the first aeration of the water in the treatment process. The purpose of the openings in the lower tank is to collect and move the sludge.

The inverted anaerobic filter (28) has a conical or concave shape at the bottom and a cylindrical shape (33*b*) to release the accumulation of sludge through gravity and lead to the bio-reaction or bio-feedback as it puts the new matter into contact with the accumulated biomass, concentrating the densest part at the bottom. It is important to mention that the diameter of the openings is small enough to prevent the filtering material from being able to pass through them.

Additionally, the inverted anaerobic filter (28) has a sludge extraction system or cleaning duct (42) which consists of an inclined tube which stretches down to the bottom of the inverted anaerobic filter (28). The cleaning duct (42) has a horizontal shunt (24*b*) which is used to extract the sludge by opening a valve (26*b*) fitted to the free end of the duct where the sludge is expelled due to the weight of the hydrostatic column and the position of the horizontal shunt of the cleaning duct which is located below the height of the feeding duct (34) as well as below the discharge duct (41). This design causes the fluid inside the inverted anaerobic filter (28) to exert pressure which pushes the sludge through the horizontal shunt of the cleaning duct (42). Another option which would produce the same result would be the use of mechanical or vacuum equipment, where, for example, a hose powered by a pump could be connected to the cleaning duct.

The last stage of the water treatment process consists of an aerobic filter (44) which was described above, which, just as the others, consists of a container with a conical bottom (50) where the water enters by means of a feeding duct (51) to the center of the filter where it has a "T" shunt whose upper arm is directed to the lid (45) of the aerobic filter (44) passing through the upper tank (52) where it pours its liquid. The upper tank (52) works as a chute, first receiving the liquid from the feeding tube and then distributing the water inside the filter through the openings (54) which are distributed perimetrically in the bottom section of the upper tank (52), producing a first aeration of the water inside the aerobic filter (44). The water drops in and rises to a level determined by the height of the output duct (59) which is placed at a lower height and opposite to the feeding duct (51), and at a greater height than the height of the lateral shunt of the cleaning duct (62). The water pours in and moves down to the contact material (55). The aerobic filter (44) can be fed from the bottom with a bubble aerator (58) (not shown) through a network of pipes to distribute the air throughout the transversal surface, thus making a counter flow to achieve better absorption.

The treated water enters the lower tank through the openings (57 and 57*b*) located both in the upper and the lower part of the wall of the lower tank (56); again, it is important to note that the diameter of the openings is small enough to prevent the filtered material (55) from entering through them, while avoiding obstruction. The solid material which succeeds in entering the lower tank (56) falls to the bottom of the lower tank (56) of the aerobic filter (44), settling in the lower cylindrical section (50) from where it can be removed through the maintenance duct (60) or by pumping, in the same way as in the other units described previously. The output of the aerobic filter (44) is through an output duct (59), which takes the already treated water from the upper part of the lower tank (56) to avoid carrying any sludge along with it. Again, this process is helped by the hydrostatic column and the gravity pull which does the work of moving the treated water from inside the lower tank (57) and out of the aerobic filter (44). In addition, the output duct (59) and the maintenance duct (60) have a shunt which extends downward toward the outside of the aerobic filter (44) to allow—if necessary—the extraction of treated water using mechanical means.

Figure 8:
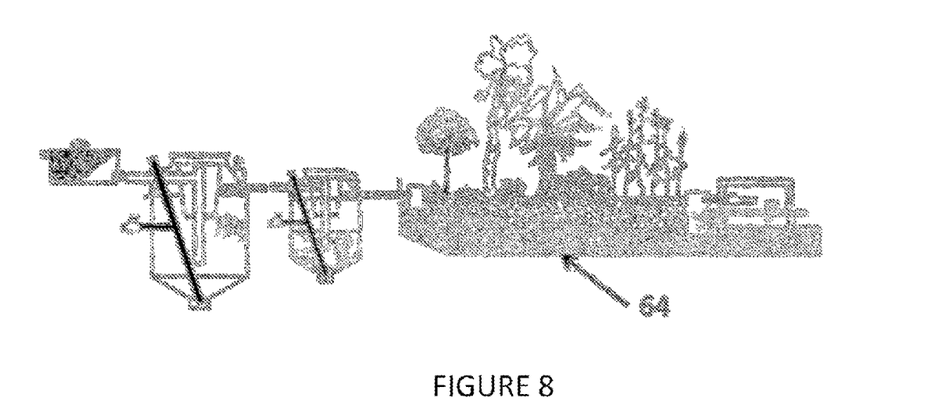
FIG. 8 is an example of how the water treatment plant can be used with artificial wetlands (64), where we can see.
Figure 9:
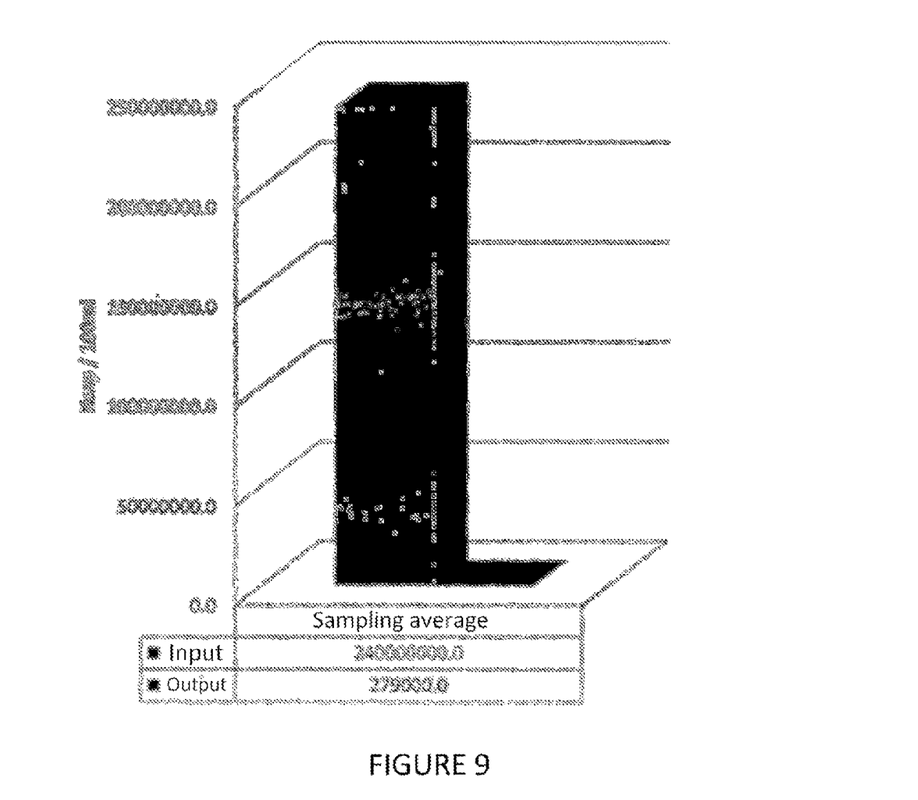
FIG. 9 shows the graphs of the results of the reduction of fecal coliforms in npm/100 in samples of waste water from a pilot test carried out in a pig farm, where the "Intensive Livestock Treatment" was designed.
Figure 10:
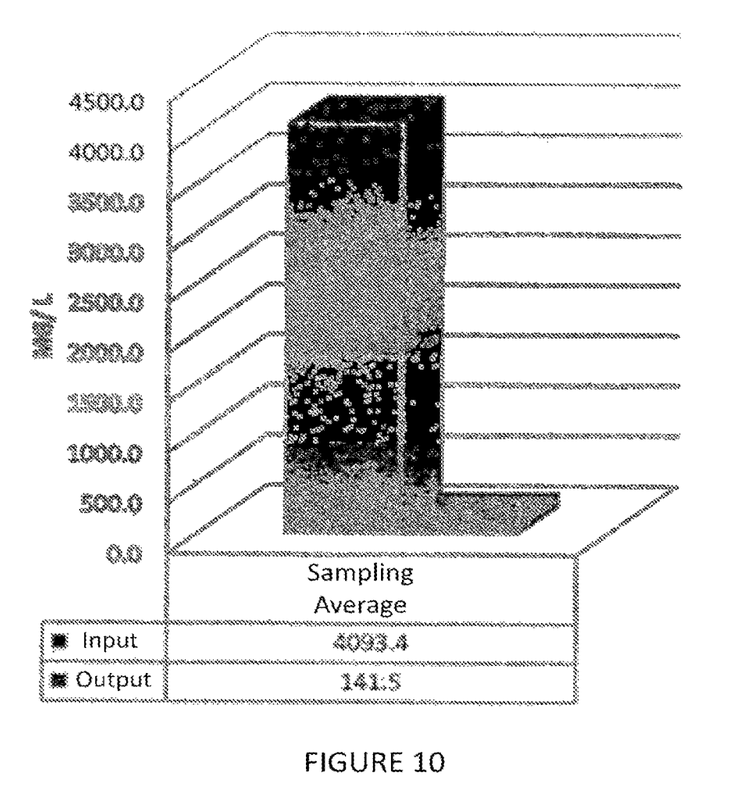
FIG. 10 shows the BDO5, Biochemical Demand of Oxygen five days into the process and measured in mg/l.
Figure 11:
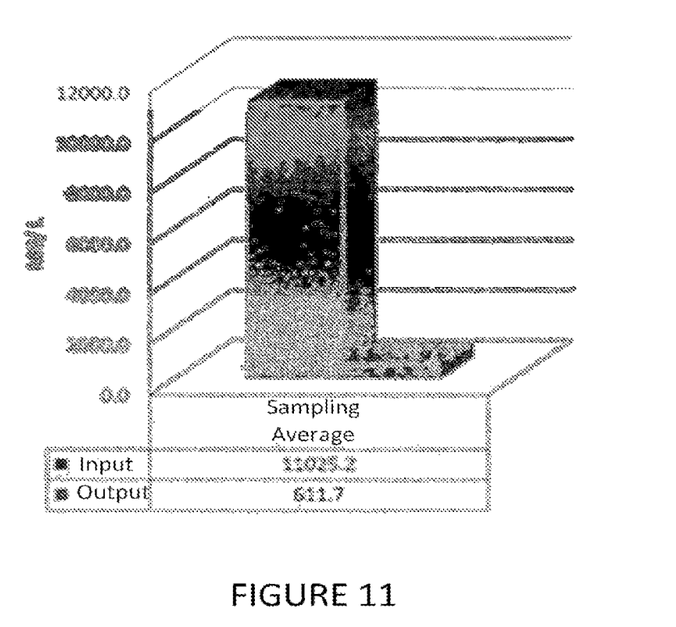
FIG. 11 shows the behavior of Chemical Oxygen Demand (COD) in mg/l during the process.
Figure 12:
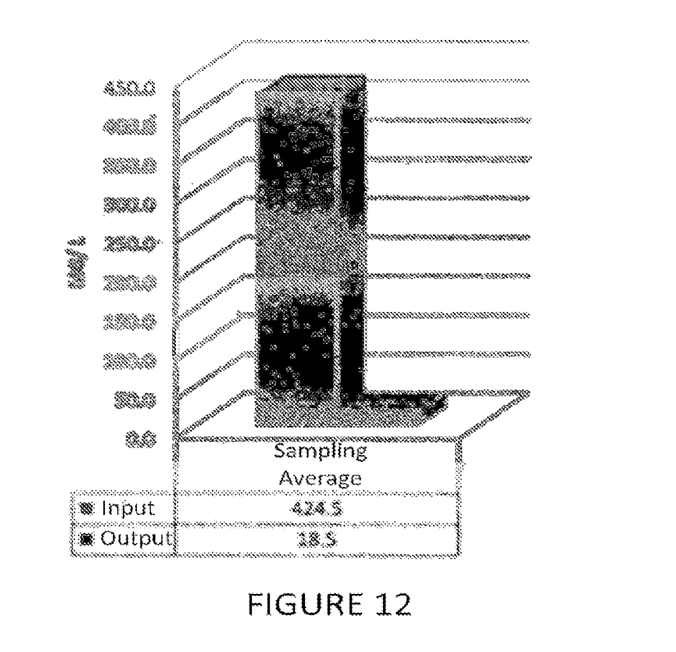
FIG. 12 shows the decay of the concentration of total phosphorus in mg/l during the process.
Figure 13:
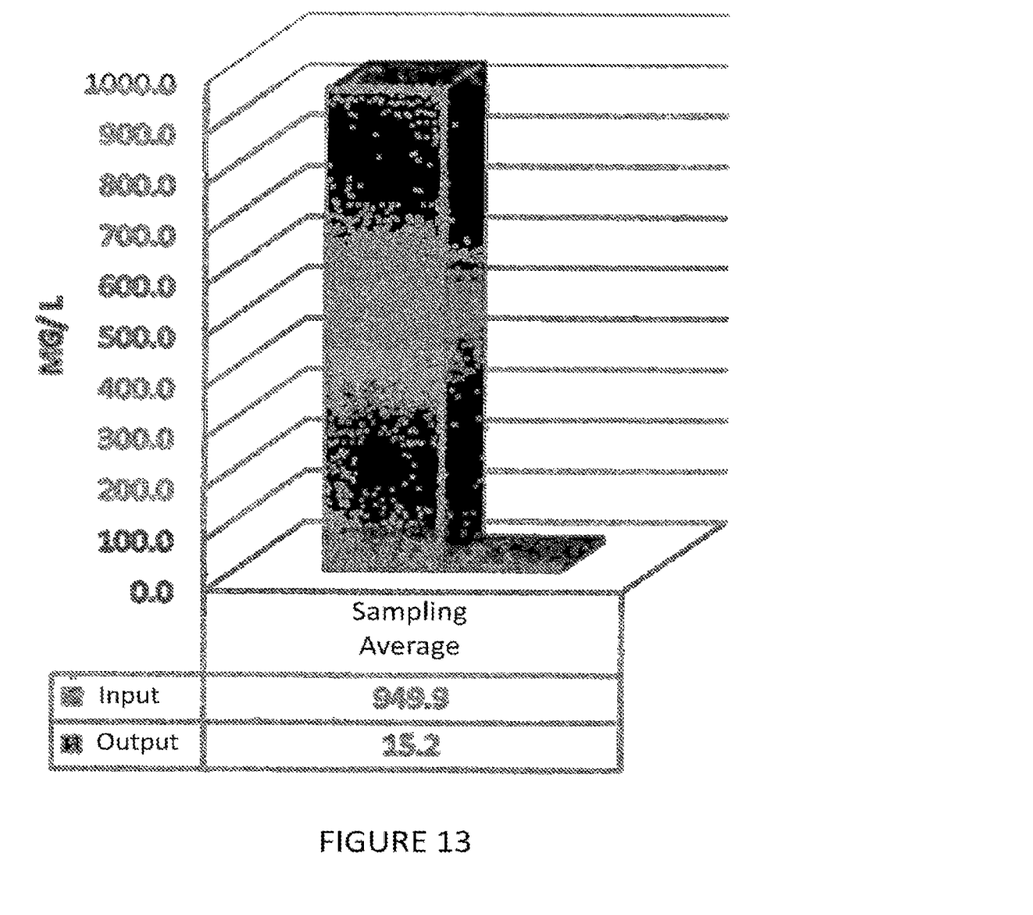
FIG. 13 allows us to evaluate the efficiency of the equipment to separate fats and oils during the process.
Figure 14:
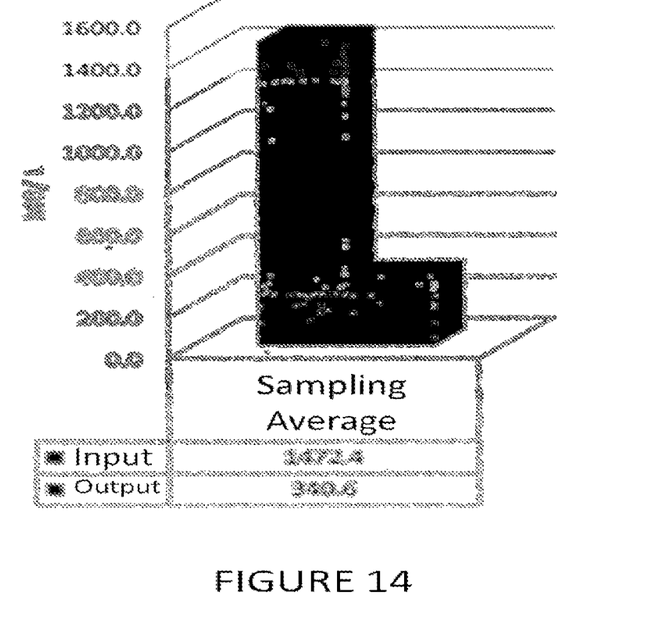
FIG. 14 shows the changes in the concentration of total nitrogen in mg/l during the process.
Figure 15:
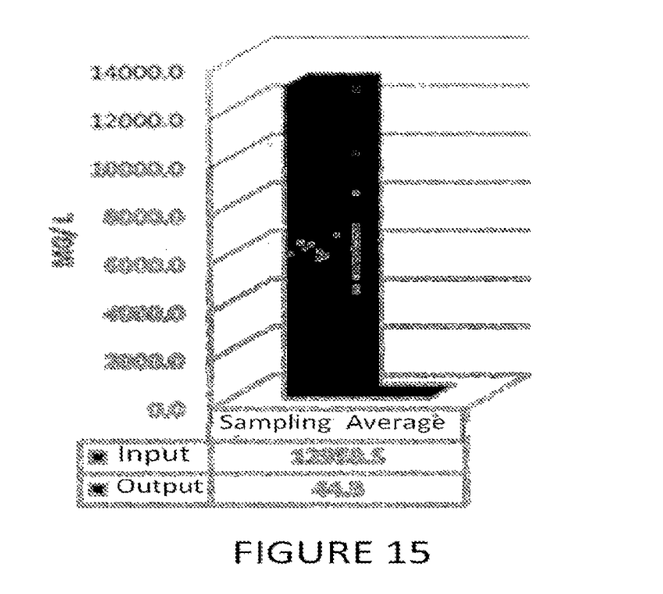
FIG. 15 shows the decrease of total suspended solids during the process.
Figure 16:
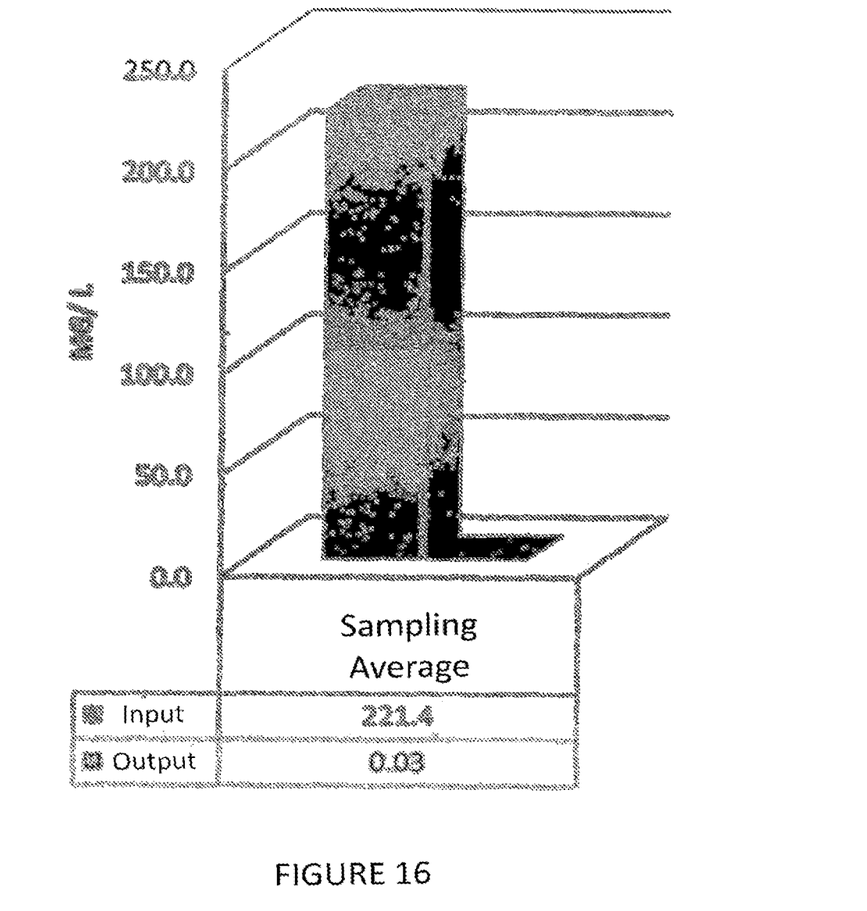
FIG. 16 shows that the settleable solids are practically eliminated during the process.

Instead of an aerobic filter—or any other extra filter—it is possible to use artificial wetlands illustrated in FIG. 8.

Additionally, the treatment plant can have a contact tank for disinfection or additional material, or a disinfection system of any kind (for example UV light).

The sequence of the treatment plant is not necessarily one-to-one; it is possible to divide the flow into five decanter bioreactors (11) and collect their effluent to feed two anaerobic filters (28) and then, to feed one or more aerobic filters (44) as needed according to the quality of the influent. That is, the treatment plant can have a series or parallel layout, thus combining the stages as needed.

The experimental results which support the present invention are shown below:

Some trials were done on a livestock farm obtaining the following results:

| Complete System | | | | |
|---|---|---|---|---|
| Analysis of the whole system | Unit | Input average | Output average | Reduction % |
| BDO | mg/l | 4093.4 | 141.5 | 96.5 |
| QDO | mg/l | 11025.2 | 611.7 | 94.5 |
| Total phosphorus | mg/l | 424.5 | 18.5 | 95.7 |
| Fat and oil | mg/l | 949.9 | 15.2 | 98.4 |
| Total Nitrogen | mg/l | 1472.4 | 340.6 | 76.9 |
| Total suspended solids | mg/l | 12958.5 | 44.3 | 99.7 |
| Settable solids | mg/l | 221.4 | 0.03 | 99.9 |

As can be seen, the results show that nearly 100% of coliforms have been eliminated from the waste water, as well as 95.7% of total phosphorus and 99% of fat and oil. Total nitrogen has been reduced 76%. The most relevant fact was that solids were reduced by practically 100%.

To further support this work, the services of a laboratory recognized by the EMA were hired. The results obtained are as follows:

| Kind of sample: Waste water simple sample Sample Identification: M1 = Discharge before treatment | | | |
|---|---|---|---|
| Parameter | Results M1 | Uncertainty K = 2 | Units |
| Fecal coliforms | 240 × 10$^5$ | NA | NMP/100 ml |
| BDO | 3879.69 | 9.68 | mg/l |
| CDO | 5955.26 | 5.03 | mg/l |
| Total Phosphorus | 55.94 | 0.46 | mg/l |
| Fat and oil | 247.14 | 1.22 | mg/l |
| Total Nitrogen | 1090.44 | 29.03 | mg/l |
| Total suspended solids | 1425.74 | 6.8 | mg/l |
| Settable solids | 15 | NA | mg/l |
| pH | 7.82 | 0.01 | Units |
| Temperature | 32 | 0.2 | C. |

Note:
The value to add or subtract from the given results is defined as uncertainty and represents the dispersion of the results. This uncertainty was determined with a cover factor K = 2 and a confidence level of 95%.

The table shows the output of the effluent after treatment in the water treatment modular plant.

| Kind of sample Waste water simple sample Identification of sample M1 = output to irrigation | | | |
|---|---|---|---|
| Parameter | Result M1 | uncertainty K = 2 | Units |
| Fecal coliforms | 279000 | NA | NMP/100 ml |
| Biochemical Demand of Oxygen | 141.5 | 9.68 | mg/l |
| Chemical Demand of Oxygen | 611.7 | 5.03 | mg/l |
| Total Phosphorus | 18.5 | 0.46 | mg/l |
| Fat and Oil | 15.2 | 1.22 | mg/l |
| Total Nitrogen | 340.6 | 29.03 | mg/l |
| Total suspended solids | 44.3 | 6.8 | mg/l |
| Settable solids | 0.03 | NA | mg/l |

Note:
The value to be added or subtracted from the given results is defined as uncertainty and represents the dispersion of results; such uncertainty was calculated with a cover factor k = 2 and a confidence level of 95%

The invention claimed is:

1. A waste water treatment plant which comprises:
   a) a tank to separate solids with an upper feeding duct and a lower discharge duct placed on opposite sides of the tank, or a lateral discharge placed laterally to the feeding duct, with a removable screen fitted in the tank to separate solids;
   b) a flow distributor element with a conical or vaulted bottom, which is fed through the bottom and has a sludge purge in the conical bottom, said flow distributor element has an output at the same level as a horizontal surface, and is configured to evenly and uniformly distribute the flow to two or more elements;
   said wastewater treatment plant is characterized as a modular plant which has at least one of each of the following elements:
   a vertical anaerobic decanter bioreactor which has a cylindrical body that has conical or vaulted ends, with an inner tank supported on the opening of the decanter bioreactor, the inner tank has a series of openings located at regular intervals on the perimeter of the low part of the wall of the inner tank to let fluid move from the body of the decanter bioreactor to a lower discharge duct which is placed at a lower height than an upper feeding duct, said vertical anaerobic decanter bioreactor also has a self cleaning system for sludge which works by gravity, wherein the diameter of the feeding duct is bigger than the diameter of the discharge duct;

a vertical inverted anaerobic filter which has an inner upper tank and a lower inner tank, both inner upper tank and lower inner tank have multiple perforations which let the fluid pass and which also allow for sludge separation, said vertical inverted anaerobic filter also contains filtering material and has a self cleaning system for sludge which works by gravity, where extraction of liquid is done from the inner upper tank by means of a chute which consists of a duct open in its upper end, in such a way that water pours in before leaving the anaerobic filter through a discharge duct;

an aerobic filter with counter flow similar to an absorption tower which has a central distribution tower, a sludge extraction system which uses a hydrostatic column, an aerator device and contact material in the form of sealings or packets fitted at random to increase the contact surface;

and additionally, a disinfection element.

2. A modular plant to treat waste water as claimed in claim 1, further comprising more than one of the following components:
 a) Screen
 b) Distributor
 c) Decanter
 d) Vertical anaerobic filter
 e) Aerobic filter based on the quality and quantity of the liquid that enters the wastewater treatment plant and the quality requirements of the liquid that exits the wastewater treatment plant.

3. A modular waste water treatment plant as claimed in claim 2, where the decanter bioreactor and the anaerobic filter are arranged in parallel and converge to the same output of the wastewater treatment plant.

4. A modular waste water treatment plant as claimed in claim 2, where the decanter bioreactor and anaerobic filter are arranged in series and converge to the same output of the wastewater treatment plant.

5. A modular waste water treatment plant as claimed in claim 2, which has an electro mechanic device to accelerate sludge cleaning.

6. A modular waste water treatment plant as claimed in claim 1, where the treatment plant further comprises an aerobic filter with a packed bed and air feeding.

7. A modular waste water treatment plant as claimed in claim 1, where the discharge of waste water is used to supply artificial wetlands.

8. A process to treat waste water where there are decanting, primary reaction and anaerobic filtering stages accomplished through the wastewater treatment plant as recited in claim 1.

9. A process to treat waste water which has the stages of decanting, primary reaction, anaerobic filtering and aerobic filtering accomplished through the wastewater treatment plant as recited in claim 1.

* * * * *